United States Patent [19]

Morgan et al.

[11] Patent Number: 5,163,133
[45] Date of Patent: Nov. 10, 1992

[54] PARALLEL PROCESSING SYSTEM HAVING A BROADCAST, RESULT, AND INSTRUCTION BUS FOR TRANSMITTING, RECEIVING AND CONTROLLING THE COMPUTATION OF DATA

[75] Inventors: Nelson H. Morgan; Alan S. Gevins, both of San Francisco, Calif.

[73] Assignee: SAM Technology, Inc., San Francisco, Calif.

[21] Appl. No.: 312,304

[22] Filed: Feb. 17, 1989

Related U.S. Application Data

[63] Continuation of Ser. No. 15,168, Feb. 17, 1987, abandoned.

[51] Int. Cl.⁵ .............................................. G06F 13/10
[52] U.S. Cl. ............................. 395/800; 364/DIG. 2; 364/931.44; 364/228.6
[58] Field of Search ... 364/200 MS File, 900 MS File, 364/513.5, 131, 132, 133, DIG. 1, DIG. 2; 381/41, 42, 43, 44, 45, 46, 47, 48, 49, 50, 40; 382/10, 41, 11, 12; 371/15.1; 395/800

[56] References Cited

U.S. PATENT DOCUMENTS

| | | | |
|---|---|---|---|
| H513 | 8/1988 | Dunne et al. | 364/516 |
| 3,701,976 | 10/1972 | Shively | 364/200 |
| 4,219,873 | 8/1980 | Kober et al. | 364/200 |
| 4,314,349 | 2/1982 | Batcher | 364/719 |
| 4,363,104 | 12/1982 | Nussmier | 364/515 |
| 4,405,838 | 9/1983 | Nitta et al. | 179/1 SD |
| 4,425,617 | 1/1984 | Sherwood | 364/200 |
| 4,521,907 | 6/1985 | Amir et al. | 381/47 |
| 4,550,437 | 10/1985 | Kobayashi et al. | 382/41 |
| 4,574,348 | 3/1986 | Scallon | 364/200 |
| 4,628,436 | 12/1986 | Okamoto et al. | 364/131 |
| 4,635,292 | 1/1987 | Mori et al. | 382/41 |
| 4,660,166 | 4/1987 | Hopfield | 364/807 |
| 4,665,556 | 5/1987 | Fukushima et al. | 382/41 |
| 4,707,833 | 11/1987 | Tamaru | 371/15 |
| 4,718,091 | 1/1988 | Kobayashi et al. | 382/41 |
| 4,760,346 | 7/1988 | Kultgen et al. | 330/69 |
| 4,760,604 | 7/1988 | Cooper et al. | 382/15 |

OTHER PUBLICATIONS

Flynn, "Some Computer Organizations And Their Effectiveness", IEE Trans. On Computers, vol. C-21, No. 9, Sep. 1972.
Baskett and Smith, "Interference in Multiprocessor Computer Systems With Interleaved Memory", Comm. Of The ACM, Jun. 1976, vol. 19, No. 6, pp. 327-334.
Hwang and Briggs, "Computer Architecture and Parallel Processing" (Pub. 1984), pp. 748-768.
Gurd, Kirkham and Watson, "The Manchester Prototype Dataflow Computer", Comm. Of The ACM, Jan. 1985, vol. 28, No. 1, pp. 34-52.
Fernbach, "Parallelism In Computing" *Proc. 1981 Int. Conf. on Parallel Processing* ISSN 0190-3918; IEEE 81 CH 1634-5, pp. 1-4.
Meilander, "History of Parallel Processing At Goodyear Aerospace", *Proc. 1981 Int. Conf. on Parallel Processing*, ISSN 0190-3918; IEEE 81 CH 1634-5, pp. 5-15.
Haynes et al, "A Survey Of Highly Parallel Computing" *Computer*, Jan. 1982 (0018-9162/82/0100-00-08-IEEE).
Fox et al, "Algorithms For Concurrent Processors" *Physics Today*, May 1984, pp. 50-58.

*Primary Examiner*—Thomas C. Lee
*Assistant Examiner*—Robert B. Harrell
*Attorney, Agent, or Firm*—Eliot S. Gerber

[57] ABSTRACT

A computer system utilizes a parallel data broadcast architecture, called "PDB" is adapted to be connected to a host computer system. In one digital embodiment, the PDB system includes an interface and global memory which is connected to the host computer system and to three common buses. The buses, in parallel, are, respectively, a data broadcast bus, an instruction bus and an output bus, each bus being connected to a plurality of computational units. Each computational unit includes an arithmetic processor, which preferably, in this embodiment, is a digital signal processor (a special-purpose integrated circuit microprocessor), a local memory and a local program memory. The computational units receive the input data simultaneously and in parallel; transform the data, depending on the parameters received from the instruction bus; and communicate their results, by multiplexing, to the output bus.

4 Claims, 6 Drawing Sheets

PARALLEL PROCESSING SYSTEM HAVING A BROADCAST, RESULT, AND INSTRUCTION BUS FOR TRANSMITTING, RECEIVING AND CONTROLLING THE COMPUTATION OF DATA

This application is a continuation of U.S. patent application Ser. No. 07/015,168, filed Feb. 17, 1987, entitled "Parallel Data Broadcast Computer System", now abandoned.

BACKGROUND OF THE INVENTION

The present invention relates to the architecture of computer systems.

The architecture of many of the present generation of commercially available computers is termed "Von Neumann", based upon the work of John Von Neumann in the 1940's. In Von Neumann computer architecture, the computer memory is physically separated from the computer processor and the two are linked by communication link. The speed of that communication link limits the speed of the entire computer system, i.e., it is a "bottle-neck".

Such conventional Von Neumann computers often have a single arithmetic unit; one memory for both instructions and data; and one address bus for both instructions and data. The data bus and address bus are the communication link. Signal processing computers frequently use an alternative computer architecture (the so-called "Harvard architecture"). The Harvard architecture uses one arithmetic unit, with separate hardware for address calculations; two memories, one for instructions and one for data; two data buses, one for instructions and one for data; and two address buses, one for instructions, and one for data. In addition, parallel combinations of either Von Neumann or Harvard computer systems or special purpose units have been proposed by various researchers. Most commonly, such systems are locally connected, since complete connectivity over many buses would be impractical In a conventional "array processor", in which a number of individual computers are connected to a central memory, long vectors are required in order to approach peak throughput.

A number of different approaches to computer architecture have been suggested in recent years based on analogies to the complex interrelationship of nerve cells in the brain. These computer systems are called "neural-net computers" (NN) or "artificial neural systems (ANS)" or "neurocomputers".

In general, the neural-net computers are connected in feedback patterns, which distinguish them from the earlier "perceptron networks", which emphasized feed-forward connectivity.

The field of neural-net computers may be considered part of the broader field of "artificial intelligence" (AI) which utilizes analogies based upon human thought processes. However, AI generally utilizes conventional digital computers having Von Neumann architecture with its communications link bottleneck. AI is generally directed to the computer programs ("software") for conventional digital computers and seeks to program functions associated with human thought, such as reasoning, learning and self-improvement.

Although the general concept and goal of designing neural-net computers has been envisioned for a few years, there is no agreement as to how the nerve cells of the human are connected or the architecture of a computer which would mimic or be an analogy to such nerve cell connections.

The literature on the subject indicates that it is a hope that neural net computers will be better able to recognize "patterns", i.e., to select and distinguish a form, such as a wave form, from a mass of similar forms, although the selected form is not exactly the same as the ideal pattern. Such pattern recognition and machine vision systems are particularly significant in instances where the patterns are "fuzzy", i.e., few or none are exact replicas of the original ideal pattern. Pattern recognition is of prime importance in speech recognition systems, handwriting and print recognition systems, object recognition for robotics, radar systems and medical diagnosis systems, such as EEG (electroencephalograph) systems.

SUMMARY OF THE INVENTION

In accordance with the present invention, there is provided a novel computer system entitled a "Parallel Data Broadcast" (PDB) system. The Parallel Data Broadcast (PDB) system is especially adapted to handle signal processing problems which require that many different arithmetic operations are performed on the same data. Some examples of these problems are neural network simulations (for machine vision or pattern recognition), linear least squares, 2-D filtering, feature subset selection, and matrix multiplication.

The architecture of the PDB system of the present invention is characterized by parallel processing. The same data to be analyzed or computed is simultaneously presented to multiple computational units ("local processors"). It is further characterized by a 3-bus architecture and the use of both local and global memory. The structure of the PDB computer system consists of:

1. Multiple computational units each having its own arithmetic processor and local data and instruction memories;
2. A fast data broadcast bus (first bus) connecting a global memory to all local computational units simultaneously;
3. A multiplexed data output bus (second bus) connecting the outputs of all the computational units to the controlling processor (host computer); and
4. An instruction bus (third bus) connecting the local program memories and local computational units to the controlling processor (host computer).

In the PDB system the same input data is processed by many different computational units, each of which may transform the input data differently. Each computational element is controlled as to the transformation it effects on the input data by its own local program memory, which preferably is controlled by a changeable computer program (software).

As a simple example, in a pattern recognition system, a PDB system consists of 100 individual computational units. The local memory of each computational unit stores a different ideal pattern, for example, a different waveform. The input data consists of the actual waveform which is to be analyzed. Each computational unit simultaneously compares the input waveform with the ideal waveform received from its local memory and provides, at its output, the results of that comparison. The host computer analyzes which result is the "best fit" (which stored waveform closest resembles the input waveform).

OBJECTIVES AND FEATURES OF THE INVENTION

It is an objective of the present invention to provide a computer system which avoids the bottleneck problem inherent in Von Neumann computer architecture.

It is a further objective of the present invention to provide such a computer system which is adapted to provide parallel processing of input data, for example, to simulate a neural network, which neural network may be used for pattern recognition and other functions.

It is a further objective of the present invention to provide such a computer system which is adapted to provide a faster processing, i.e., throughput, of certain types of signals, and is especially adapted for the faster processing of linar least square analysis of signals, 2-D filtering, feature subset selection and matrix multiplication.

BRIEF DESCRIPTION OF THE DRAWINGS

Other objectives and features of the present invention will be apparent from the following detailed description, taken in conjunction with the accompanying drawings.

In the drawings.

DESCRIPTION OF THE PREFERRED EMBODIMENT

Figure 1:
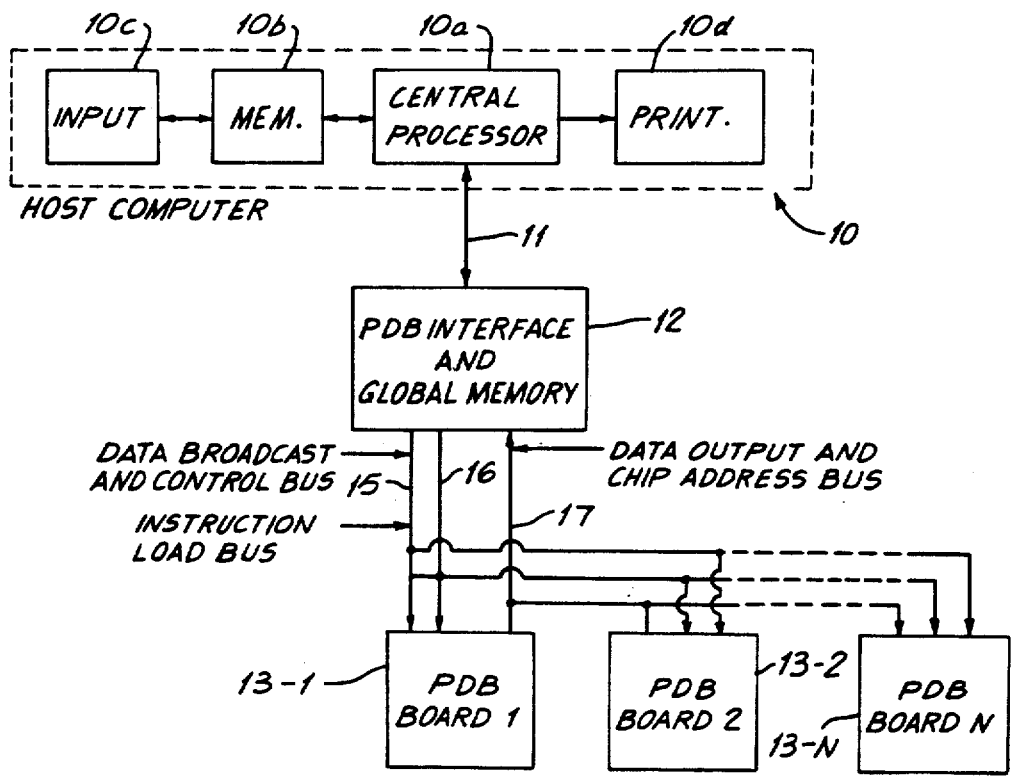
FIG. 1 is a block diagram of the first embodiment of the present invention illustrating the host computer system, the parallel data broadcast board (PDB) interface and the PDB printed circuit boards.

As shown in FIG. 1, the Parallel Data Broadcast (PDB) computer system of the present invention includes a "host computer" 10 having input and output communication line 11 connecting it to the PDB Interface and Global Memory 12. The host computer 10 is a conventional digital computer system, for example, a Sun Microsystems 3/160, having a central processor 10a, a hard disk (Winchester drive) memory storage 10b a set of floppy disk drives 10d used to input data, and a printer 10d The "PDB Interface and Global Memory 12 has an internal memory in RAM (random access memory) of 1024K.

The PDB Interface and Global Memory 12 communicates with the PDB Boards 13 by three buses. A bus is a common wire or lead serving several inputs or outputs in parallel, i.e., a "trunk", "highway" or "common lead".

Preferably, the system includes a number of PDB Boards which are printed circuit boards, for example, ten, and each board consists a number of computational units 14, for example, eight computational units on each PDB board. Consequently, in that example of ten boards each with eight computational units, each of the three buses is in direct parallel connection to eighty computational units 14.

The first bus 15 is the "Data Broadcast and Control Bus" which provides simultaneous data input to each of the computational units. Each computational unit receives the same data input. The second bus 16 is the "Instruction Load Bus" which provides the sequence of instructions to each computational unit 14. The third bus 17 is the "Data Output and Chip Address Bus" which takes the output, by multiplexing, from each computational unit and transmits it to the PDB Interface 12.

Figure 2:
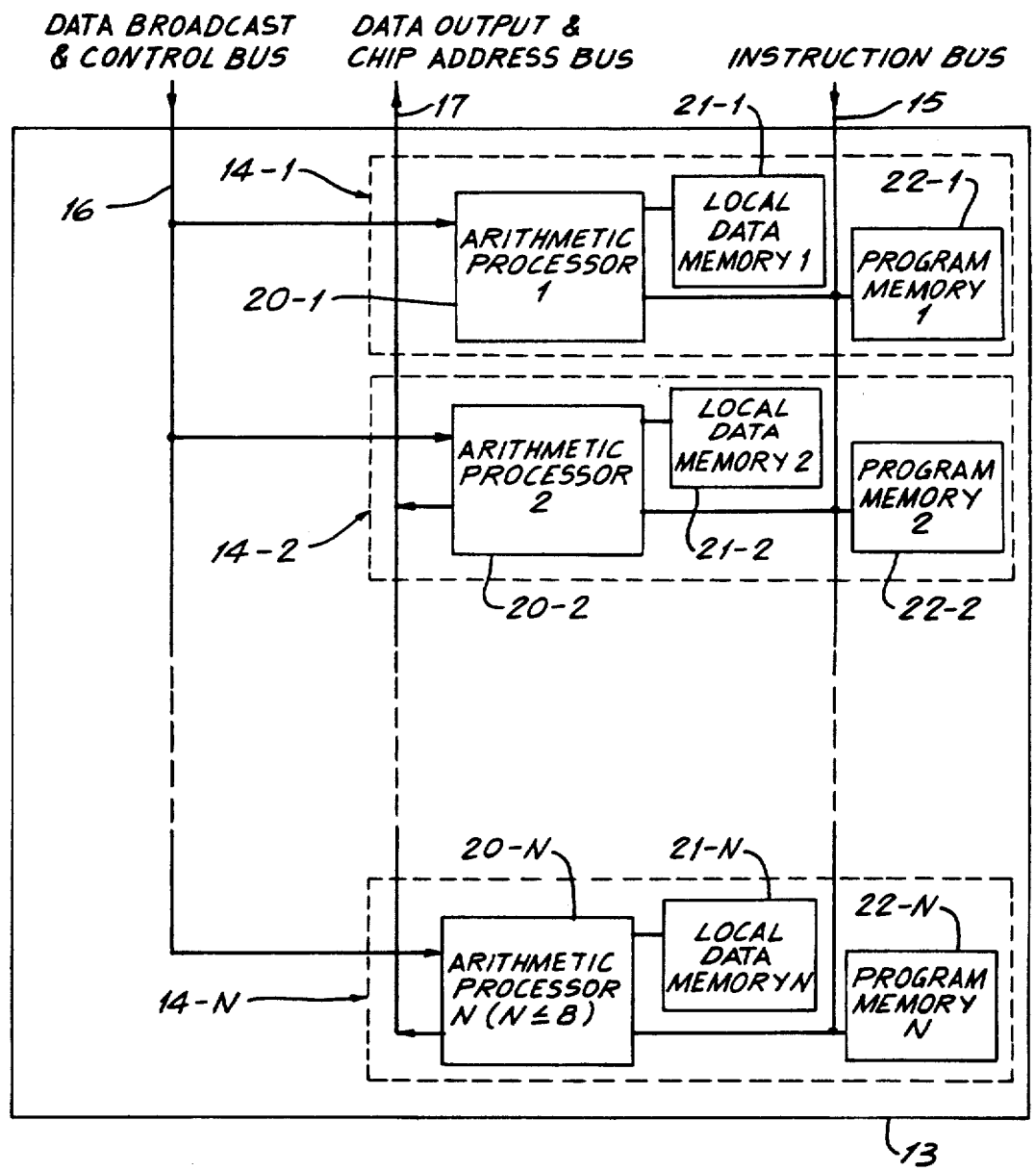
FIG. 2 is a block circuit diagram of one of the printed circuit boards of FIG. 1.

As shown in FIG. 2, each computational unit 14 comprises an arithmetic processor 20, a local data memory 21, and a program memory 22. Each PDB board 13 preferably has one to eight computational units. The board 13 shown in FIG. 2 has computational units 14-1 through 14-N, where N is equal to or less than eight. The arithmetic processors 20 on the board shown in FIG. 2 are labeled 20-1 to 20-N.

The computational units 14 shown in FIG. 2 use discrete components. A preferred alternative is the use of digital signal processing chips (DSP) described in detail below.

The computer system shown in FIGS. 1 and 2 can be characterized as a Multiple Instruction Single Datastream (MISD) machine, since the same input data goes to multiple processors. Each processor implements possibly different transformations with different parameters. The operation of the PDB computer system, shown in FIGS. 1 and 2, consists of:

1. Loading each program memory 22, by use of the instruction load bus 15, with the desired sequence of operations 2. Pre-loading each local high-speed data memory 21 with parameters by selectively turning on individual arithmetic processors 20 with the control bus 15 and then broadcasting the parameters on the data broadcast and control bus 16.

3. Turning on all arithmetic processors, using the control bus 16, and initiating their execution;

4. A sequencing circuit on the PDB interface board 13 broadcasts data synchronously from global memory, which is on the PDB interface board 12 along the data broadcast bus 16 to each processor 20; and 5. Partial results are collected in one of two ways by the host computer 10.

a. In the first way, the host computer 10 receives a vectored interrupt from each computational unit 14 that has finished a computation. It then reads the data from that computational unit from the data output bus 17. This is useful for long calculations for which the interrupt latency is not significant and for which the computational unit's completion time depends on the data.

b. In the second way, the host computer 10 fetches results from each computational unit 14 at an expected time. This second way is preferred for deterministic cycle lengths because its overhead is low.

6. Partial results, for algorithms with feedback, are processed by the host computer 10 and placed in global memory 12 for further processing by the PDB computer system.

This sequence of events is controlled by the host computer 10. A software library of "macros" stored in the host computer 10 provides standard matrix operations without the need for further instructions from outside the system. A "macro" is a macroinstruction, a specified sequence of instructions, generally written in source or assembly language code. Specific macro libraries provide neural network, 1-D and 2-D filtering, and linear least squares functions.

The system is tolerant of failure of individual computational units, for example, one or more of the units 14-1 to 14-N may fail. Hardware diagnostics are automatically run on a timed basis, for example, once per major computational job. In the event of a computational unit failure, the working copies of the library macros, in the host computer, are altered to ignore results from those computational units found to be faulty.

There are four preferred embodiments of these PDB system principles. They are described below in order of increasing throughput and corresponding decreasing flexibility. Only the hardware differences are described, since the software will be roughly the same (differing, of course, at the machinespecific code level). VME bus boards are given as examples here, since such boards are in common use. Boards with nonstandard sizes can be used for larger or stand-alone systems.

Figure 3:
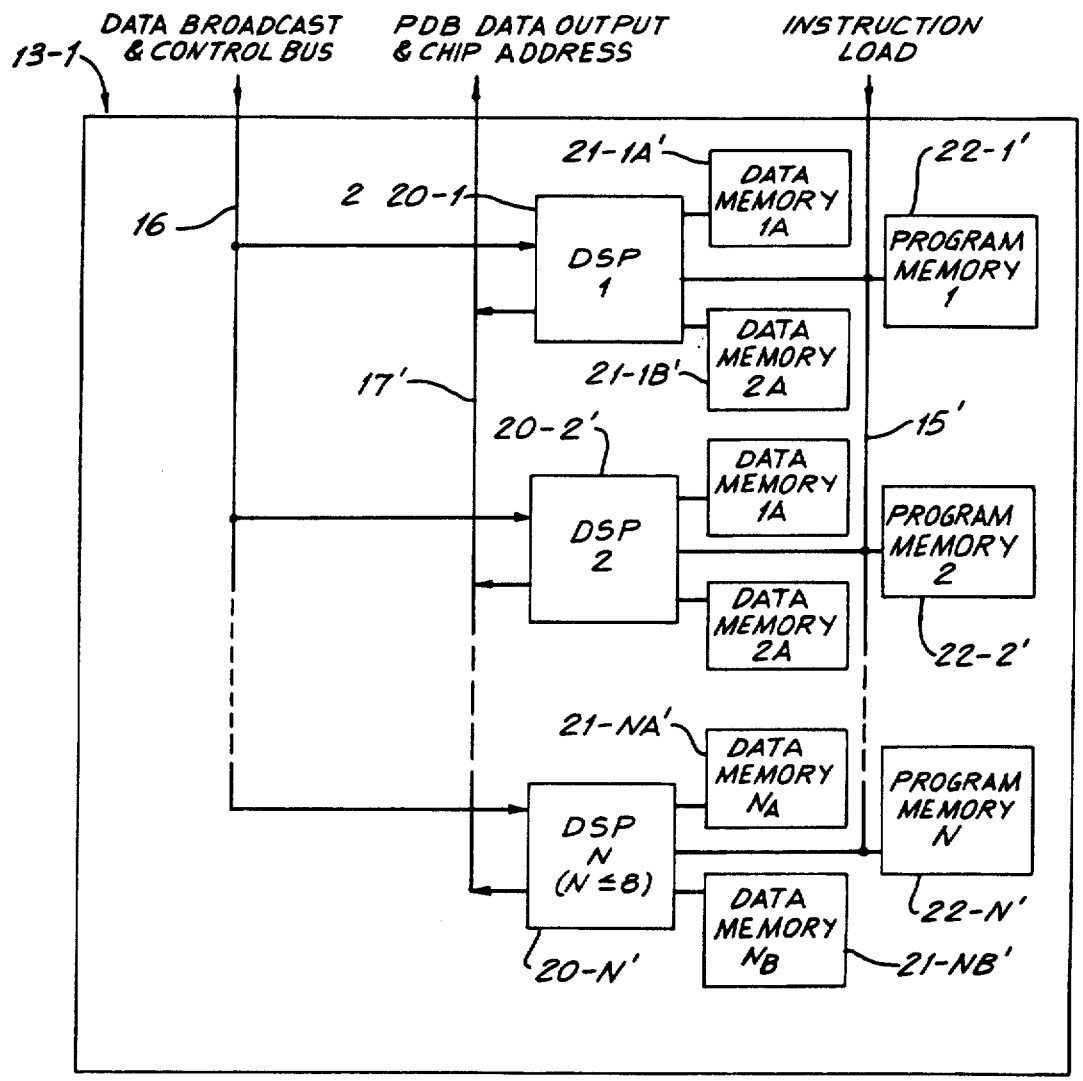
FIG. 3 is a block circuit diagram of one of the printed circuit boards of FIG. 1 utilizing general purpose digital signal processing (DSP) integrated circuits.

The four preferred embodiments are:

1. As shown in FIG. 3, 32-bit floating point using digital signal processing (DSP) chips and off-chip local memories.

Program memory in the Global Memory 12 stores instructions for the DSP chips. In FIG. 2 the DSP chips are used for DSP-1 through DSP-N. This produces 10 arithmetic MIPS (millions of instructions per second) per chip, 40 MIPS for each standard size VME board, and 160 MIPS for a system of 4 boards. A typical floating point DSP chip is the NEC $\mu$PD77230.

In general, a "digital signal processor" is a specialpurpose microcomputer which is a large-scale integrated circuit (LSI) performing arithmetic operations, specifically multiplication in dedicated hardware, and having an internal register memory, ALU and multiplier and separate internal and external data in instruction buses. Each computational unit is a single integrated circuit, i.e., a chip, and the units 20-1 through 20-8 are mounted on a board. Preferably there are 2-8 boards, each the same as shown in FIG. 2 and connected in parallel.

The "Data Memory" and "Program Memory" are on different chips (integrated circuits), for example, they are general purpose RAM (Random Access Memory) integrated circuits, each of 64K bits capacity.

2. As shown in FIG. 3, 16-bit fixed point using DSP chips and off-chip local memories. Program memory stores instructions for the DSP chips. This produces 20 arithmetic MIPS per chip, 80 MIPS per standard size VME board, and 320 MIPS for 4 boards.

Figure 4A:
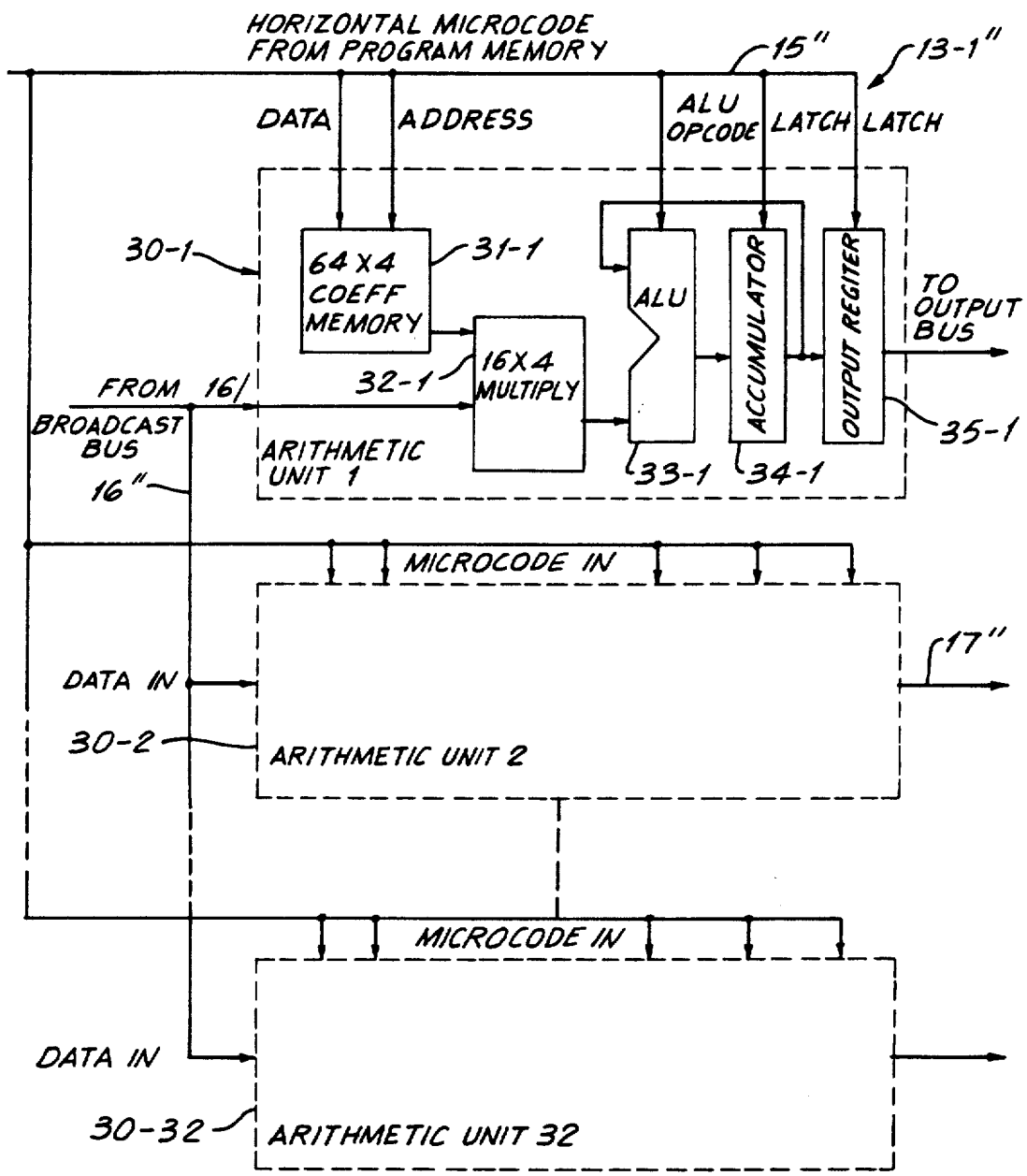
FIG. 4A is a block circuit diagram of a PDB printed circuit board in which each computational unit is a special purpose digital integrated circuit (chip)
Figure 4B:
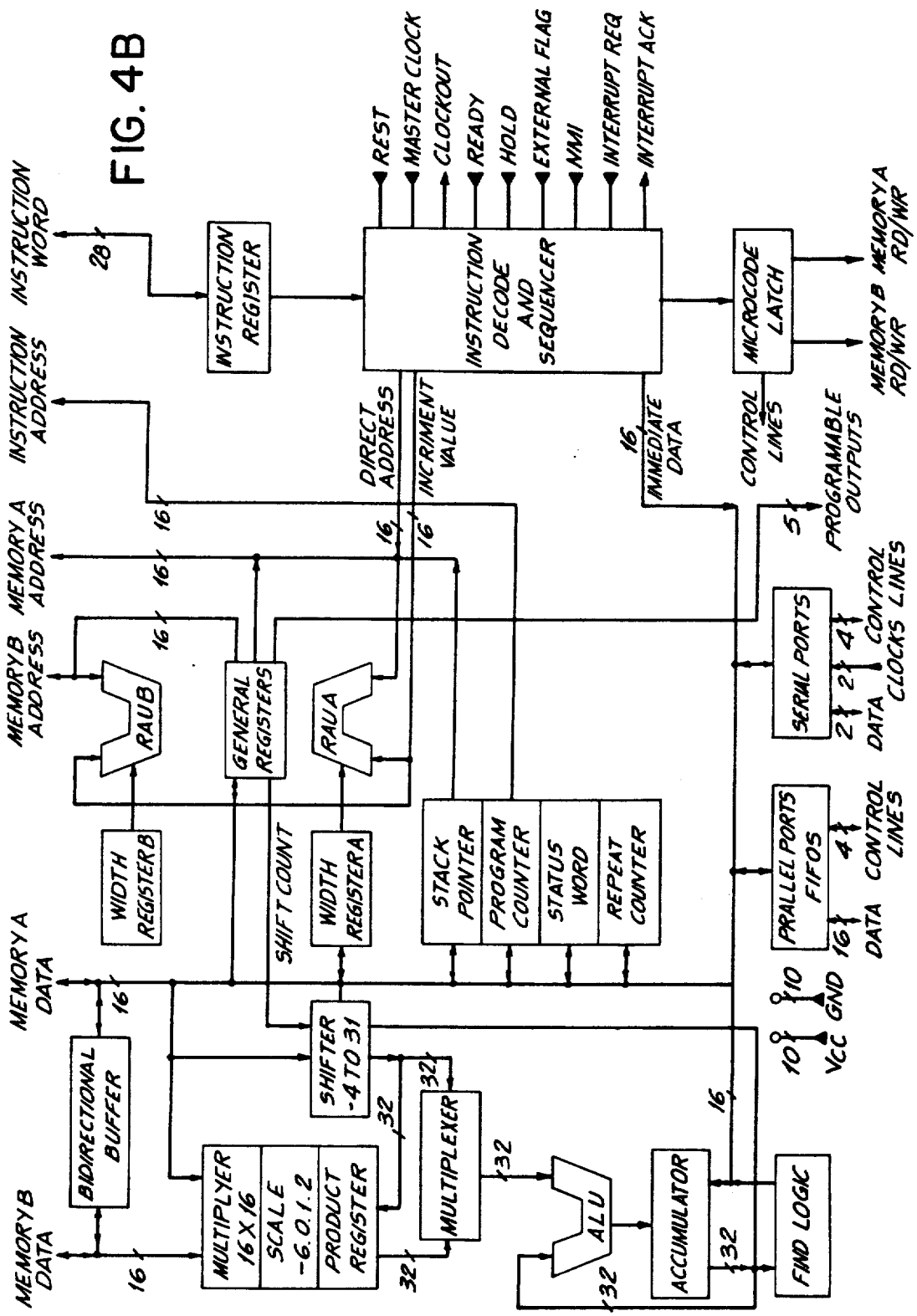
FIG. 4B is a block circuit diagram of a commercial digital signal processor (DSP)

The preferred Digital Signal Processor (DSP) is the Micro CMOS (Complementary Metal Oxide Semiconductor) "LM 32900" digital signal processor of National Semiconductor Corp. described in its publication RRD-B20M46 of April 1986, incorporated by reference herein and illustrated in FIG. 4B. The circuit shown in FIG. 4B is one DSP, such as DSP20-1', from FIG. 3. As shown in FIG. 4B, the input from the data line, corresponding to data broadcast bus 16', is the parallel ports FIFOS at 16 "DATA". The inputs from the "Data Memory A", such as 21-1A' and "Data Memory B", such as 21-1B", both of FIG. 3, is to the "Bidirectional Buffer" and then to the "Multiplier 16×16". The Program Memory 22-1' provides the "Instruction Word" to the "Instruction Register" of the DSP of FIG. 4B and its "Programmable Output" is to Data Output bit 17'.

Another type of DSP chip is the "TMS 32020 DSP" from Texas Instruments; see TM532020 User's Guide, Texas Instruments, Incorporated, Houston, Tex. (1985), incorporated by reference herein.

3. As shown in FIG. 4A, 16-bit fixed point with 4-bit nonlinear multipliers implemented on custom CMOS (Complementary Metal Oxide Silicon) VLSI (Very Large-Scale Integrated Circuit). Each computational unit includes an arithmetic processor 30-1 to 30-32. The arithmetic processor includes a 64×4 coefficient memory 31-1 to 31-32, which is the "local memory", a 16×4 multiply unit 32-1 to 32-32, an ALU unit (Arithmetic and Logic Unit) 33-1 and 33-32 which includes the "program memory"; an accumulator 34-1 to 34-22 and an output register 35-1 to 35-32. These units are shown in FIG. 4A only in arithmetic unit 1, for simplicity of illustration, although they are present in all the arithmetic units 30-1 through 30-32. The program memory of the ALU stores horizontal microwords, including parameters, which are pre-loaded into parameter program memory for each on-chip arithmetic unit, as well as arithmetic and logic unit (alu) opcodes and lines to gate signal flow. Since the arithmetic operations use short multiplier wordlengths, many (e.g., 32) arithmetic units can be implemented on a moderate-sized CMOS integrated circuit at present silicon feature sizes (1.5-2 microns). Each unit operates at roughly a 10 MHz rate, with pipelined multiply and accumulate functions. This yields 640 arithmetic MIPS per chip, primarily for use in neural networks or other problems in which short wordlength filter coefficients are sufficient, such as in certain image processing calculations. This produces 2560 MIPS per board, and 10240 MIPS for four boards.

Figure 5B:
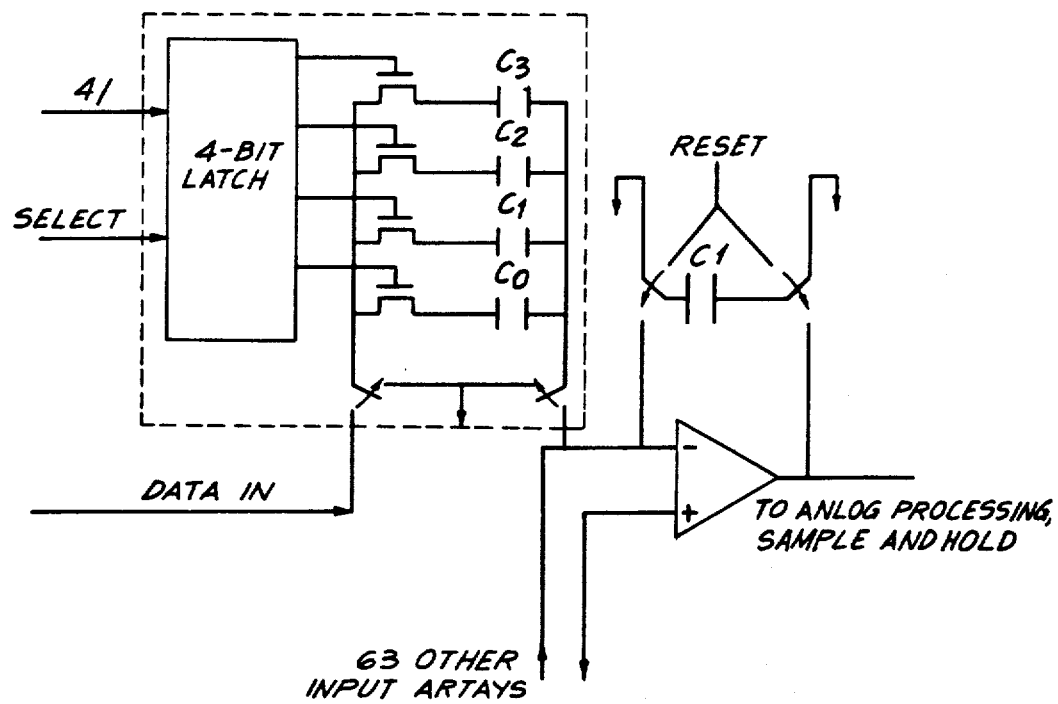
FIG. 5B is a partial circuit diagram of an integrated circuit which is the switched capacitor multiplying D/A converter (MDAC), a portion of the circuit of FIG. 5A.
Figure 5A:
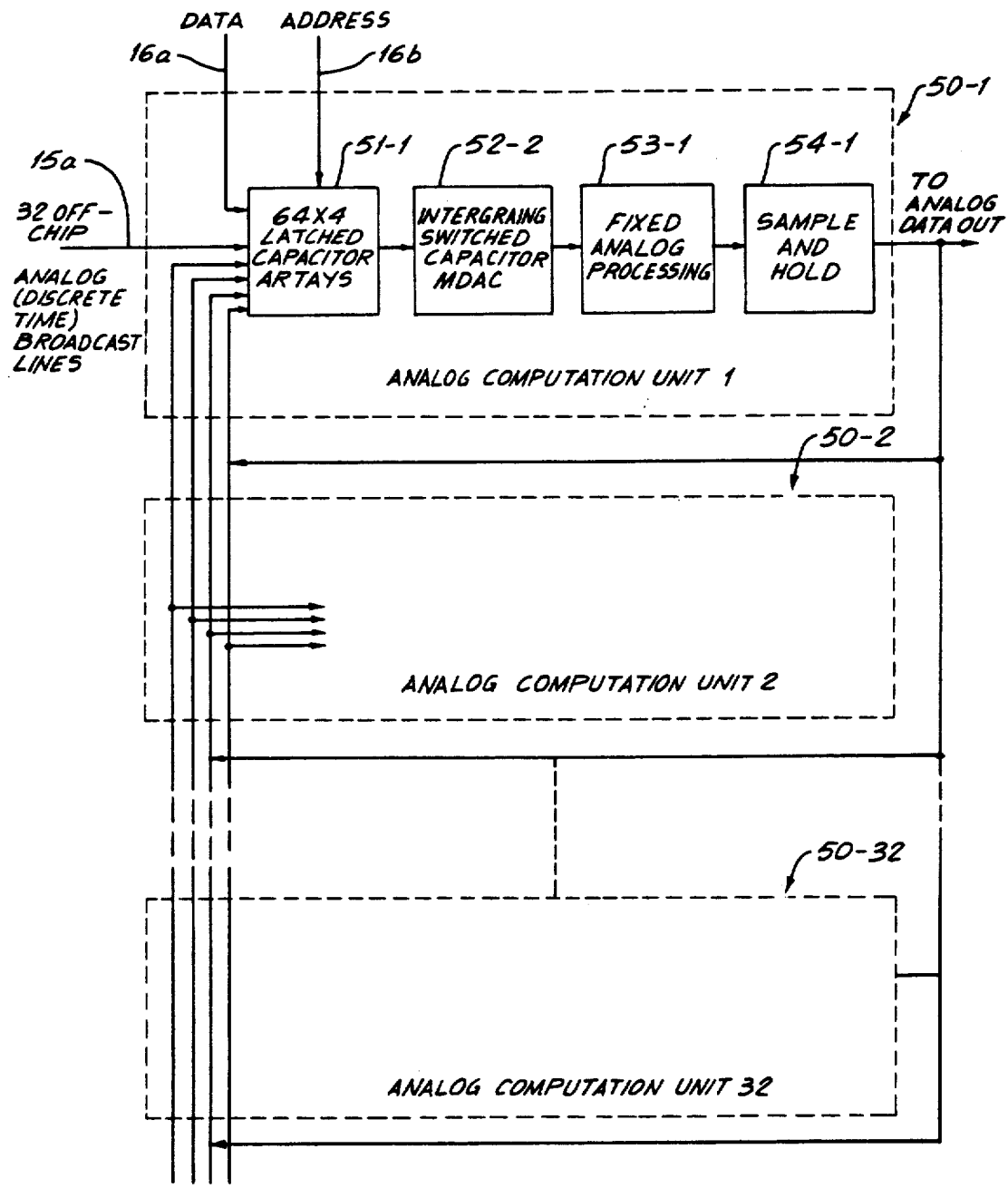
FIG. 5A is a block circuit diagram of the embodiment of the present invention using an analog switched capacitor integrated circuit.

4. Analog discrete-time using custom switched-capacitor integrated circuits, with the equivalent multiplier wordlength a nonlinear 4 bits as in method 3 (FIGS. 5A and 5B). On each "instruction" cycle, charge is dumped into each integrating switched capacitor 52 (MDAC) from up to 64 banks of switched latched capacitors 51. Thirty-two of the MDAC 52 take input from on-chip computational units, while thirty-two receive input from off-chip units. The latched capacitors 51 which determine the total parallel capacitance (and thus the charge) for each input is the "program memory" and equivalent to the parameter memory of FIG. 4A. The pre-loading of parameters is therefore the same as in the previous implementation of FIG. 4A. The data broadcast lines in this case are analog lines which are simultaneously accessed at roughly a 1 MHz rate. While this is 10 times lower than the digital clock rates of the digital implementations described above, the analog system provides 64 equivalent multiplies (capacitive weightings) and accumulates 4000 arithmetic MIPS per chip, 16000 MIPS per board, and 64000 MIPS for four boards.

A suitable analog circuit is shown in FIG. 5A, which illustrates the circuitry of an integrated circuit which is a switched capacitor multiplying D/A (digital-to-analog) converter ("MDAC" or Multiplying Digital Analog Converter). The technology of switched-capacitor integrated circuits is reviewed in "A High-Performance Micropower Switched-Capacitor Filter", Castello & Gray, *IEEE Journ. of Solid State Circuits,* Vol. SC 20 No. 6, December 1985, incorporated by reference herein. Such circuits use MOS (metal-oxide semiconductor) technology and may employ 5 um CMOS methods. The 5 um CMOS technology provides a minimum channel depth of 5 um, thickness of 400 anstroms, and capacitor oxide thickness of 1000 angstroms, giving an area of 700 mil.sq./pole. They employ CMOS operational amplifiers (OP AMP) and have generally been suggested for use as filter circuits.

As shown in FIG. 5A, each analog computation unit 50-1 through 50-32 (only three units being shown for clarity) are connected, at its input and in parallel, to the analog (discrete time) data broadcast line.

The details of the analog computational units 50-1 through 50-32 are shown in the unit 50-1, each of the other units having the same circuitry. Each computational unit is a single integrated circuit, i.e., a chip, and the units 50-1 through 50-32 are mounted on a board. Preferably there are 2-8 boards, each the same as shown in FIG. 5 and connected in parallel.

The analog computational unit 50-1 consists of a 64×4 latched capacitor array 51-1 which receives instructions from data line 16a and address line 16b; an integrating switched capacitor (MDAC) 52-1; a fixed analog processing circuit 53-1, and a sample-and-hold circuit 54-1 connected to the data output line, which is also connected in parallel.

For each of the above four embodiments, the actual throughput will be close to theoretical peak throughout for any problem with as many transformations on each number as there are physical computational elements. For embodiments 1 and 2, this number would only be 16 for a 4-board system. For embodiments 3 and 4, which are appropriate for neural network or image processing problems, this number would be 1000 or 500 respectively. In each case, instruction decoding operating and instruction fetches, address calculations, and loop control arithmetic all add no significant overhead for embodiments 2, 3 and 4. (Embodiment 1 will have additional overhead depending on the application and commercial chip chosen).

What is claimed is:

1. A parallel data computer system for the analysis of digital data in the form of data words, said computer system including a host computer system, common line first, second and third bus means connected to said host computer systems; each of said bus means being connected in parallel to a plurality of computational units;
   each of said computational units comprising an arithmetic processor means for execution of arithmetic analysis of said digital data including the arithmetic multiplication and addition of said digital data, the arithmetic processor means having a data input port and a data output port, each computational unit further comprising a local data memory and a program memory control means, connected to the local data memory and the arithmetic processor means, for controlling the arithmetic processor according to a program in the local data memory and for thereby producing analyzed data at the output port;
   the first bus means being a data broadcast bus means which is connected to each of the data input ports of the arithmetic processors, to simultaneously broadcast the data words to be simultaneously executed by each of the arithmetic processor means as each data word is broadcast thereto and without prior delivery of the data words to the local data memories;
   the second bus means being a data output bus, connected to the data output ports, to gather the analyzed data and communicate the analyzed data to the host computer system; and
   the third bus means being an instruction bus means, connected to each program memory means to instruct each program memory as to a programmed arithmetic analysis of the digital data, the programmed analysis being different as between a plurality of the computational means.

2. A parallel data computer system for the analysis of digital data in the form of data words, said computer system including a host computer system, common line first, second and third bus means connected to said host computer system; each of said bus means being connected in parallel to a plurality of computational units;
   each of said computational units comprising a digital signal processor (DSP) as an arithmetic processor means for execution of arithmetic analysis of said digital data including the arithmetic multiplication and addition of said digital data, the digital signal processor (DSP) having a data input port and a data output port, each computational unit further comprising a local data memory and a program memory control means, connected to the local data memory and the digital signal processor (DSP), for controlling the digital signal processor (DSP) according to a program in the local data memory and for thereby producing analyzed data at the output port;
   the first bus means being a data broadcast bus means connected to each of the data input ports of the digital signal processors (DSP), to simultaneously broadcast the data words to be simultaneously executed by each of the digital signal processors (DSP) as each data word is broadcast thereto and without prior delivery of the data words to the local data memories;
   the second bus means being a data output bus, connected to the data output ports, together the analyzed data and communicate the analyzed data to the host computer system; and
   the third bus means being an instruction bus means, connected to each program memory means, to instruct each program memory as to a programmed arithmetic analysis of the digital data, the programmed analysis being different as between a plurality of the computational means.

3. A parallel data computer system for the analysis of data, said computer system including a host computer system, common line first, second and third bus means connected to said host computer system; each of said bus means being connected in parallel to a plurality of computational units;
   each of said computational units comprising an arithmetic processor means for execution of arithmetic analysis of said data including the arithmetic multiplication and addition of said data, the arithmetic processor means being a switched-capacitor integrated circuit having a data input port and a data output port, each computational unit further comprising a local data memory and a program memory control means, connected to the local data memory and the arithmetic processor means, for controlling the arithmetic processor according to a program in the local data memory and for thereby producing analyzed data at the output port;

the first bus means being an analog data broadcast bus means, connected to each of the data input ports of the arithmetic processors, to simultaneously broadcast the data to be simultaneously executed by each of the arithmetic processor means without prior delivery of the data to the local data memories;

the second bus means being a data output bus, connected to the data output ports, to gather the analyzed data and communicate the analyzed data to the host computer system; and the third bus means being an instruction bus means, connected to each program memory means, to instruct each program memory as to a programmed arithmetic analysis of the data, the programmed analysis being different as between a plurality of the computational means.

4. A method for the analysis of digital data in the form of data words using a parallel data computer system, said computer system including a host computer system, common line first, second and third bus means connected to said host computer system; each of said bus means being connected in parallel to a plurality of computational units;

each of said computational units comprising an arithmetic processor means for execution of arithmetic analysis of said digital data including the arithmetic multiplication and addition of said digital data, the arithmetic processor means having a data input port and a data output port, each computational unit further comprising a local data memory and a program memory control means, connected to the local data memory and the arithmetic processor means, for controlling the arithmetic processor according to a program in the local data memory and for thereby producing analyzed data at the output port;

the first bus means being a data broadcast bus means, connected to each of the data input ports of the arithmetic processors, to simultaneously broadcast the data words to be simultaneously executed by each of the arithmetic processor means as each data word is broadcast thereto and without prior delivery of the data words to the local data memories;

the second bus means being a data output bus, connected to the data output ports, to gather the analyzed data and communicated the analyzed data to the host computer system; and the third bus means being an instruction bus means, connected to each program memory means;

the method comprising the steps, in order, of:

(a) sending instructions over the third bus means to each program memory as to a programmed arithmetic analysis of the digital data, the programmed analysis being different as between a plurality of the computational means;

(b) broadcasting the data words simultaneously to each data input port and simultaneously executing the arithmetic analysis of the data using each of the arithmetic processor means; and (c) gathering the analyzed data on the second bus and communicating the analyzed data to the host computer.

* * * * *